Oct. 27, 1931.  J. SCHIER  1,829,614
VERTICAL AND HORIZONTAL ANGLE MEASURER
Filed Oct. 22, 1928

Patented Oct. 27, 1931

1,829,614

UNITED STATES PATENT OFFICE

JOHANN SCHIER, OF VIENNA, AUSTRIA, ASSIGNOR TO C. P. GOERZ OPTISCHE ANSTALT AKTIENGESELLSCHAFT AKCIOVA SPOLECNOST K. P. GOERZ OPTICKY USTAV, OF BRATISLAVA, CZECHOSLOVAKIA

VERTICAL AND HORIZONTAL ANGLE MEASURER

Application filed October 22, 1928, Serial No. 314,274, and in Germany October 27, 1927.

The subject matter of the present invention is a tripod for acoustic or optical observation instruments enabling the observer, while in a position as commodious as possible, to readily and accurately effect the adjustment of the said observation instruments into any position in space, the altitude and azimuth angles of such instruments being ascertained by suitable means or being transmitted to other instruments.

According to the present invention this result is obtained by providing an observer's seat adapted to turn around a vertical axis above a frame carried by a horizontal supporting ring supported by three or more feet, such observer's seat serving at the same time as a support for the instrument fast on the same, the direction of observation at any time existing being either indicated by pointers on an altitude and an azimuth scale or being directly transmitted by any electric angle transmitting devices to other instruments.

Figure 1:
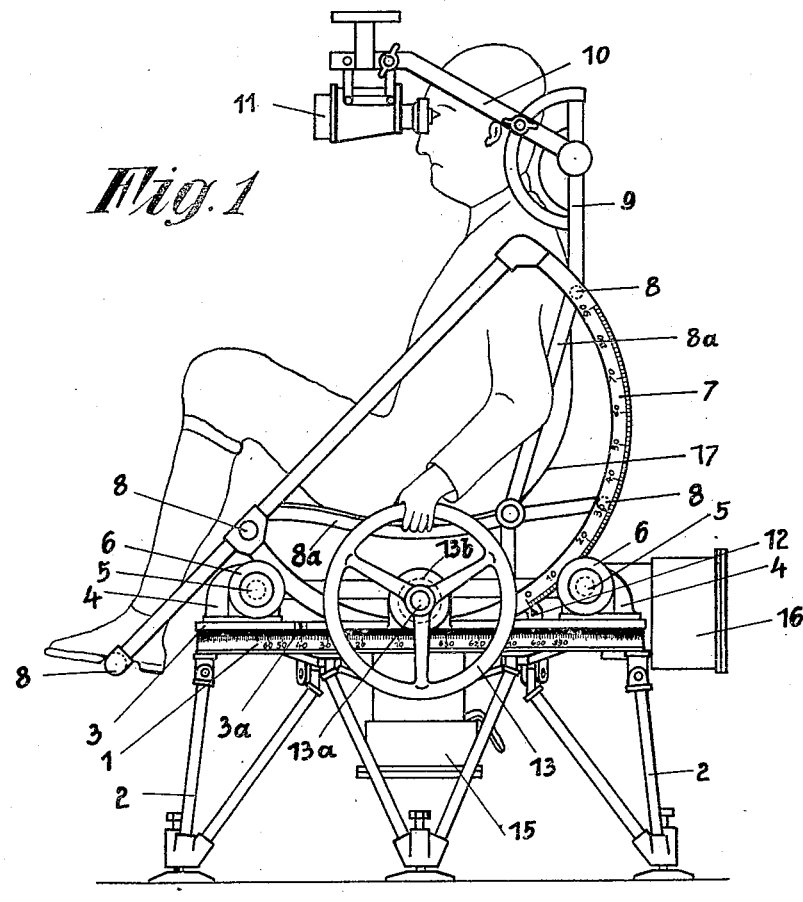
Figure 2:
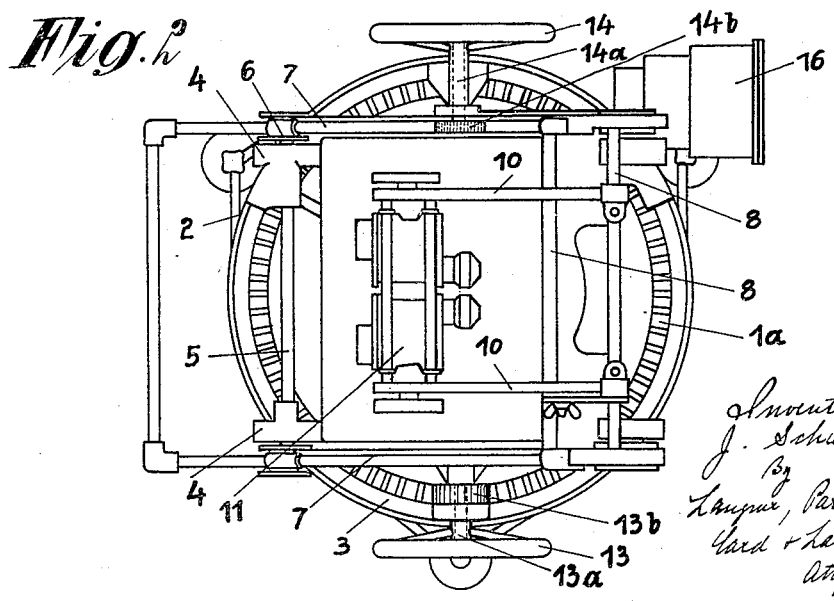

The annexed drawings illustrate by way of example a constructional form of the invention, Fig. 1 is a side elevation and
Fig. 2 is a plan view.

The horizontal supporting ring 1 provided with an azimuth scale is supported by three V-shaped feet 2 and carries the ball supported frame 3 overlapping its supporting ball race and carrying the azimuth pointer 3a and four supporting bearings 4 in which the two shafts 5, 5 are journalled. On each of the two shafts two flanged rollers 6 are mounted, by which rollers the two circular segments 7 of the observer's seat are carried, such segments being provided with an altitude scale and being connected with each other by transverse rods 8, 8a between which a broad belt 17 is arranged serving as the observer's seat. The carrier 10 of the observing instrument 11, as shown an optical one, is pivoted to the back support 9 in such a manner, that for a horizontal direction of observation the pointer 12 carried by the supporting ring 3 coincides with the zero point of the altitude scale on the segment 7.

For adjusting the direction of observation or for continuously following a moving target to be kept in sight the hand wheels 13 and 14 are provided each of which is fixedly mounted on a horizontal shaft 13 and 14 respectively journalled on the frame 3. The shaft 13a carries a toothed wheel 13b meshing into the crown teeth 1a on the supporting ring 1, while on the shaft 14a a toothed wheel 14b is fixedly mounted which meshes into the internal teeth of the right hand segment, 7, so that by actuating the left hand wheel 13 variation of azimuth, and by actuating the right hand wheel 14 variation of the altitude of the direction of observation is brought about. The altitude and the azimuth of the direction of observation may also be directly transmitted to other apparatus for instance search lights by means of any known angle transmitting apparatus as indicated as electric ones by the casing 15 for the azimuth and by the casing 16 for the altitude.

Instead of an optical observation or measuring instrument also of course an acoustic one, such as an apparatus for determining the direction of incoming sound waves may be used.

What I claim is:

1. In means for supporting observation instruments, a frame, a member mounted on said frame for substantially horizontal rotation, circular arcs having chords and comprising a second frame and having a center internal to their chords mounted in said member to swing about their centers as an axis, and a seat for an observer mounted in said second frame.

2. In means for supporting observation instruments, a frame, a member mounted on said frame for substantially horizontal rotation, rolls mounted on said member to form the corners of a rectangular figure, substantially parallel circular arcs having chords and arranged in substantially vertical planes and mounted each in combination with a cooperating pair of rolls, the said arcs comprising a second frame and having a center internal to their chords, and swinging on the rolls about their centers as an axis, and an observer's seat mounted in said second frame.

3. In means for supporting observation instruments, a frame, a member mounted on said frame for substantially horizontal rotation, circular arcs having chords and comprising a second frame and having a center internal to their chords mounted on said member to swing about their centers as an axis, a seat for an observer in said second frame, and separate, rotatable means, mounted one on each side of said seat, one for rotating the said member, and the other for rotating the said second frame.

4. In means for supporting observation instruments, a frame, a ring mounted on said frame for substantially horizontal rotation, gear teeth on said ring forming an annular rack, circular arcs having chords and comprising a second frame and having a center internal to their chords mounted on said member to swing about their centers as an axis, a rack on said second frame, a seat for an observer on said second frame, a hand wheel on one side of said seat, and having a pinion for operating the rack on the ring, and another hand wheel on the other side of the seat, and having a pinion for operating the rack on the ring, and another hand wheel on the other side of the seat, and having a pinion for operating the rack on the said second frame.

5. In means for supporting observation instruments, a frame, a member mounted on said frame for substantially horizontal rotation, a multi-legged support for said frame, some at least, of the legs of which are substantially vertically adjustable, circular area having chords and comprising a second frame and having a center internal to their chords mounted in said member to swing about their centers as an axis, and a seat for an observer mounted on said second frame.

6. In means for supporting observation instruments, a frame, a member mounted on said frame for substantially horizontal rotation, circular arcs having chords and comprising a second frame and having centers internal to their chords mounted on said member to swing about their centers as an axis, a seat for an observer mounted on said second frame, angle transmitting apparatus for indicating rotation of the member, and angle transmitting apparatus for indicating rotation of the second frame.

7. In means for supporting observation instruments, a frame, a member mounted on said frame for substantially horizontal rotation, circular arcs having chords and comprising a second frame and having centers internal to their chords mounted on said member to swing about their centers as an axis, a seat for an observer mounted on said second frame, an arc mounted above said second frame, a pivotally mounted carrier guidable about said arc, and an observation instrument carried by said carrier.

8. In a tripod for observation instruments, the combination of a frame, a supporting ring carried by such frame, an observer's seat mounted on the said supporting ring, a horizontal shaft comprising two parts arranged in alignment and journalled in the said frame, means for operatively connecting one of the said parts of the horizontal shaft with the said ring such means comprising a hand wheel within the reach of one hand of the observer, and means for operatively connecting the other of the said parts of the horizontal shaft with the said seat, such latter means comprising a hand wheel within the reach of the other hand of the observer, whereby the ring is rotated around a vertical axis and the seat is rotated around a horizontal axis, means for indicating the extent of rotation of the seat around the said horizontal axis and means for indicating the extent of rotation of the ring around the said vertical axis, and an observing instrument fixed to the said seat.

In testimony whereof I have affixed my signature.

JOHANN SCHIER.